United States Patent
Kemeny et al.

(10) Patent No.: US 7,493,458 B1
(45) Date of Patent: Feb. 17, 2009

(54) TWO-PHASE SNAP COPY

(75) Inventors: John Kemeny, Westford, MA (US); Michael R. McCarthy, Mansfield, MA (US); Bradford B. Glade, Harvard, MA (US); David Harvey, Newton, MA (US); James A. Wentworth, III, Shrewsbury, MA (US); William B. Whalen, Shrewsbury, MA (US); Matthew Waxman, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 417 days.

(21) Appl. No.: 10/941,671

(22) Filed: Sep. 15, 2004

(51) Int. Cl.
*G06F 12/00* (2006.01)
(52) U.S. Cl. .................... 711/161; 711/162
(58) Field of Classification Search ........... 711/161, 711/162
See application file for complete search history.

(56) References Cited

U.S. PATENT DOCUMENTS

| 5,206,939 | A |   | 4/1993  | Yanai et al. |         |
|-----------|---|---|---------|--------------|---------|
| 5,778,394 | A |   | 7/1998  | Galtzur et al. |       |
| 5,845,147 | A |   | 12/1998 | Vishlitzky et al. |    |
| 5,857,208 | A | * | 1/1999  | Ofek ........... | 707/204 |
| 6,907,507 | B1 | * | 6/2005 | Kiselev et al. ..... | 711/162 |
| 6,959,373 | B2 |  | 10/2005 | Testardi |          |
| 6,973,549 | B1 |  | 12/2005 | Testardi |          |
| 6,986,015 | B2 |  | 1/2006  | Testardi |          |
| 7,013,379 | B1 |  | 3/2006  | Testardi |          |

FOREIGN PATENT DOCUMENTS

WO  WO03/071419  8/2003

OTHER PUBLICATIONS

U.S. Appl. No. 09/608,521, filed Jun. 30, 2000, Raju C. Bopardikar, et al.

* cited by examiner

*Primary Examiner*—Hyung S Sough
*Assistant Examiner*—Mardochee Chery
(74) *Attorney, Agent, or Firm*—Muirhead and Saturnelli, LLC

(57) ABSTRACT

A point in time copy of a data set is provided using a two-phase snapshot copy operation. When a write request is received, as part of the first phase, a chunk including the target location of the write request is determined. Using a "copy on first write" technique, the data at the target location is copied to a snap data area in an allocated data area that is the size of the chunk. A first map for the data set is updated to include up to three entries representing a mapping of the segment including the target location. A second map for the snap data area is updated to include a single entry for the copy of the data from the target location. As part of the second phase, the multiple entries in the first map are coalesced into a single entry after the remaining portions of the chunk are copied to the data area in the snap data area.

34 Claims, 12 Drawing Sheets

TWO-PHASE SNAP COPY

BACKGROUND OF THE INVENTION

1. Technical Field

This application relates to computer storage devices, and more particularly to the field of transferring data between storage devices.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A host may issue a request to make a point in time copy or "snapshot" of a data set, such as logical disk unit or file. One existing technique includes making a complete physical copy of the data included in the data set. In order to make a complete copy, no further data modification to the data set, such as in connection with a write operation, can be performed prior to copying the data in the data set to the snapshot copy. The foregoing may not be desirable for use in instances where the data set being copied may also be available on-line for use in connection with I/O operations prior to making a complete snapshot copy.

Another way of making a snapshot copy of a data set uses a "copy on first write" technique. In this technique, storage is allocated for use as a snap data area for storing the existing or old data. When a write request is received to modify a storage location in the data set, the existing data at the storage location to be modified is first read and copied into the snap data area. The existing data set is then updated in accordance with the write operation. One problem that may result with this technique is the fragmentation of the snap data area since storage is allocated and used in accordance with each write operation. It may be difficult to use an efficient coalescing technique where multiple snap data area entries associated with consecutively located data portions are combined into a single entry since this may require a large number of I/O operations. Additionally, data structures used in managing the allocation of the snap data area may be complex as a result of large numbers of I/O operations causing large numbers of snap data area entries.

Yet another technique may include initially allocating storage for an entire data volume or data set for which a point in time copy is being made in response to a request for a snapshot copy. However, allocating such large amounts of storage can cause inefficient use of space if snapshots are performed frequently.

Thus, it is desirable, in a number of circumstances, to use a technique for creating a point in time copy or snapshot of a data set that overcomes one or more drawbacks of the existing techniques. It is also desirable to use a technique that is space efficient, reduces fragmentation associated with storage areas and management data structures, and also has a low latency associated with an I/O operation.

SUMMARY OF THE INVENTION

In accordance with one aspect of the invention is a method for creating a point in time copy of a data set comprising: receiving a write request to modify a target location in a segment of said data set; allocating a portion in a data area, said portion being a size of said segment; copying existing data from said target location to said portion of said data area; updating said target location in accordance with said write operation; and copying remaining areas of said segment to said portion of said data area as part of a background copy operation while allowing I/O operations to said data set. Said receiving, said copying existing data to said data area, and said updating may be included in a first phase of a copy technique. I/O operations to said segment may be performed during said first phase. After said updating, a response may be sent to a requestor initiating said write request indicating a status of said write request. The requestor may be a host system. Said copying said remaining areas of said segment may be included in a second phase of a copy technique. The second phase may be performed after said sending a response to a requestor. The second phase may be performed proactively. The method may also include: determining when a threshold amount of said segment is copied to said data area as a result of I/O operations; and in response to said determining, performing said second phase. Said allocating, said copying existing data, and said copying remaining areas may be performed only when said write request is a first write request with respect to said point in time copy. The first phase may further comprise: determining a first data area physically immediately preceding said target location in said segment; determining a second data area physically immediately following said target location in said segment; creating an entry in a first map for said data set for each of said target location, said first data area, and said second data area, said data set being included in a logical volume that is mapped to a physical storage location in accordance with entries in said first map, said entries being created when a size of an associated logical data area is non-zero; and creating an entry in a second map for said target location in said data area, wherein a logical volume for said data area is mapped to physical storage in accordance with entries in said second map. If said first data area is empty, no entry may be created in said first map corresponding to said first data area, and wherein if said second data area is empty, no entry may be created in said first map corresponding to said second data area. The copying remaining areas may be included in a second phase of said copy technique. The second phase may further comprise: coalescing entries in said first map for said portion of said data set into a single entry for said entire portion; and setting an indicator in said single entry indicating that said portion of said first point in time copy has been modified. The second phase may also include updating a status indicator to indicate which portions of said remaining areas have been copied. The second map may be used in combination with said first map to obtain said point in time copy of said data set, and wherein said first map may be used to obtain a current view of said data set.

In accordance with another aspect of the invention is a computer program product including a computer readable medium for creating a point in time copy of a data set comprising code that: receives a write request to modify a target location in a segment of said data set; allocates a portion in a data area, said portion being a size of said segment; copies existing data from said target location to said portion of said data area; updates said target location in accordance with said write operation; and copies remaining areas of said segment to said portion of said data area as part of a background copy operation while allowing I/O operations to said data set. The code that receives, said code that copies existing data to said data area, and said code that updates may be included in code that performs a first phase of a copy technique. I/O operations to said segment may be performed during said first phase. The computer program product may also include code that sends a response to a requestor initiating said write request indicating a status of said write request. The requestor may be a host system. The code that copies said remaining areas of said segment may be included in code that performs a second phase of a copy technique. The second phase may be performed after sending said response to said requestor. The second phase may be performed proactively. The computer program product may also include code that: determines when a threshold amount of said segment is copied to said data area as a result of I/O operations; and in response to said determining, performs said second phase. The code that allocates, said code that copies existing data, and said code that copies remaining areas may be executed only when said write request is a first write request with respect to said point in time copy. The code that performs first phase may further comprise code that: determines a first data area physically immediately preceding said target location in said segment; determines a second data area physically immediately following said target location in said segment; creates an entry in a first map for said data set for each of said target location, said first data area, and said second data area, said data set being included in a logical volume that is mapped to a physical storage location in accordance with entries in said first map, said entries being created when a size of an associated logical data area is non-zero; and creates an entry in a second map for said target location in said data area, wherein a logical volume for said data area is mapped to physical storage in accordance with entries in said second map. If said first data area is empty, no entry may be created in said first map corresponding to said first data area, and wherein if said second data area is empty, no entry may be created in said first map corresponding to said second data area. The code that copies said remaining areas may be included in code that performs a second phase of said copy technique. The code that performs said second phase may further comprise code that: coalesces entries in said first map for said portion of said data set into a single entry for said entire portion; and sets an indicator in said single entry indicating that said portion of said first point in time copy has been modified. The code that performs said second phase may further comprise code that: updates a status indicator to indicate which portions of said remaining areas have been copied. The second map may be used in combination with said first map to obtain said point in time copy of said data set, and wherein said first map may be used to obtain a current view of said data set.

In accordance with another aspect of the invention is a method for creating a point in time copy of a data set comprising: receiving a write request to modify a target location in a segment of said data set; allocating a portion in a data area, said portion being a size of said segment; updating a corresponding target location in said portion of said data area corresponding to said target location in said data set; and copying remaining areas of said segment included in said data set to said portion of said data area as part of a background copy operation while allowing I/O operations to said data set, said remaining areas being areas of said segment excluding said target location.

In accordance with yet another aspect of the invention is a computer program product for creating a point in time copy of a data set comprising code that: receives a write request to modify a target location in a segment of said data set; allocates a portion in a data area, said portion being a size of said segment; updates a corresponding target location in said portion of said data area corresponding to said target location in said data set; and copies remaining areas of said segment included in said data set to said portion of said data area as part of a background copy operation while allowing I/O operations to said data set, said remaining areas being areas of said segment excluding said target location.

BRIEF DESCRIPTION OF DRAWINGS

Features and advantages of the present invention will become more apparent from the following detailed description of exemplary embodiments thereof taken in conjunction with the accompanying drawings in which.

DETAILED DESCRIPTION OF EMBODIMENTS

Figure 1:
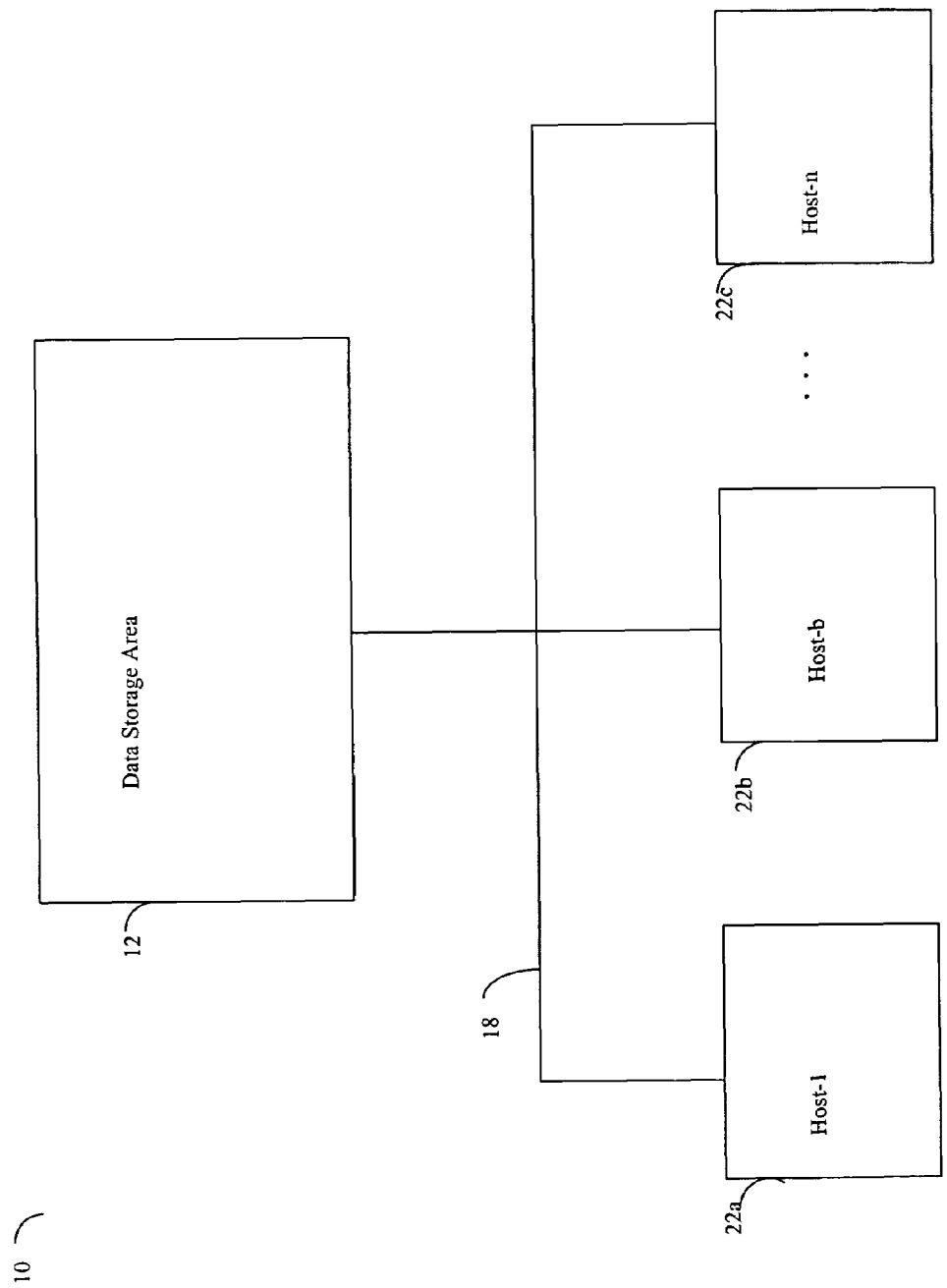
FIG. 1 is an example of an embodiment of a system described herein.

Referring now to FIG. 1, shown is an example of an embodiment of a computer system according to the present invention. The computer system 10 includes a data storage area 12 connected to host systems 22a-22c through communication medium 18. In this embodiment of the computer system 10, the N hosts 22a-22c may access the data storage area 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 22a-22c may access and communicate with the data storage area 12, and may also communicate with each other and other components included in the computer system 10.

Each of the host systems 22a-22c and the data storage area 12 included in the computer system 10 may be connected to the communication medium 18 by any one of a variety of connections as may be provided and supported in accordance with the type of communication medium 18. The processors included in the host computer systems 22a-22c may be any one of a variety of proprietary or commercially available single or multi-processor system, such as an Intel-based processor, IBM mainframe or other type of commercially available processor able to support incoming and outgoing traffic in accordance with each particular embodiment and application.

It should be noted that the particulars of the hardware and software included in each of the host systems 22a-22c and the data storage area 12 are described herein in more detail, and may vary with each particular embodiment. Each of the host computers 22a-22c may all be located at the same physical site, or, alternatively, may also be located in different physical locations. Examples of the communication medium that may be used to provide the different types of connections between the host computer systems and the data storage area of the computer system 10 may use a variety of different communication protocols such as SCSI, ESCON, Fibre Channel, or GIGE (Gigabit Ethernet), and the like. Some or all of the connections by which the hosts and data storage area 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 22a-22c may issue a data request to the data storage area 12 to perform a data operation, such as a read or write operation.

Figure 2:
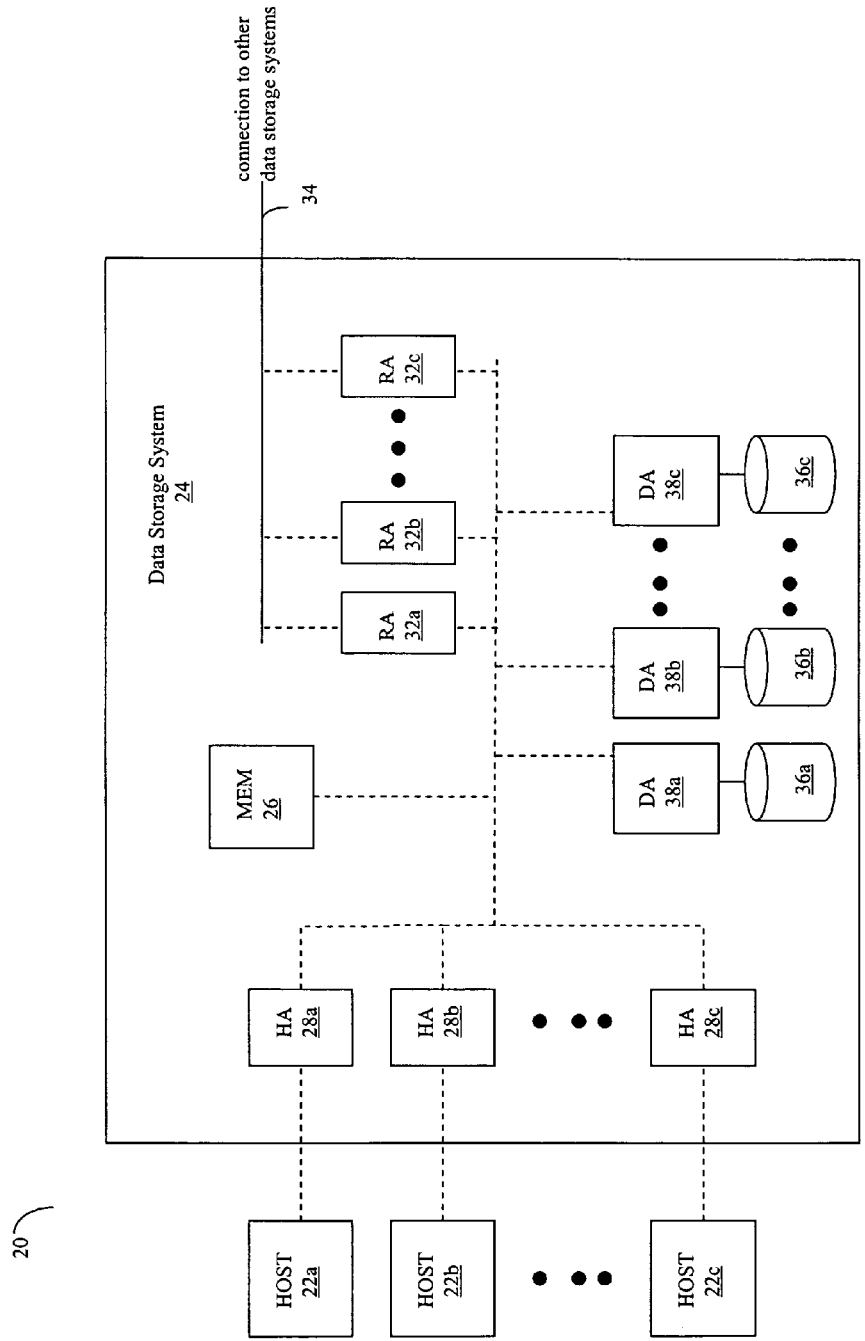
FIG. 2 is an example of a more detailed schematic diagram of the system of FIG. 1 showing a plurality of hosts and a data storage system included therein.

Referring now to FIG. 2, shown is a diagram 20 illustrating additional detail of one embodiment of the system 10 of FIG. 1. The plurality of hosts 22a-22c are coupled to a data storage system 24. The data storage system 24 may be one of a plurality of data storage systems included in the data storage area 12. The data storage system 24 includes an internal memory 26 that facilitates operation of the storage system 24 as described elsewhere herein. The data storage system also includes a plurality of host adaptors (HA's) 28a-28c that handle reading and writing of data between the hosts 22a-22c and the storage system 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage system 24 may include one or more RDF (Remote Data Facility) adapter units (RA's) 32a-32c. The RA's 32a-32c are coupled to an RDF link 34 and are similar to the HA's 28a-28c, but are used to transfer data between the storage system 24 and other storage system (not shown) that are also coupled to the RDF link 34. The storage system 24 may also include one or more disks 36a-36c, each containing a different portion of data stored on the storage device 24. Each of the disks 36a-36c may be coupled to a corresponding disk adapter unit (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage system 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c.

The storage system 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric.

Figure 3:
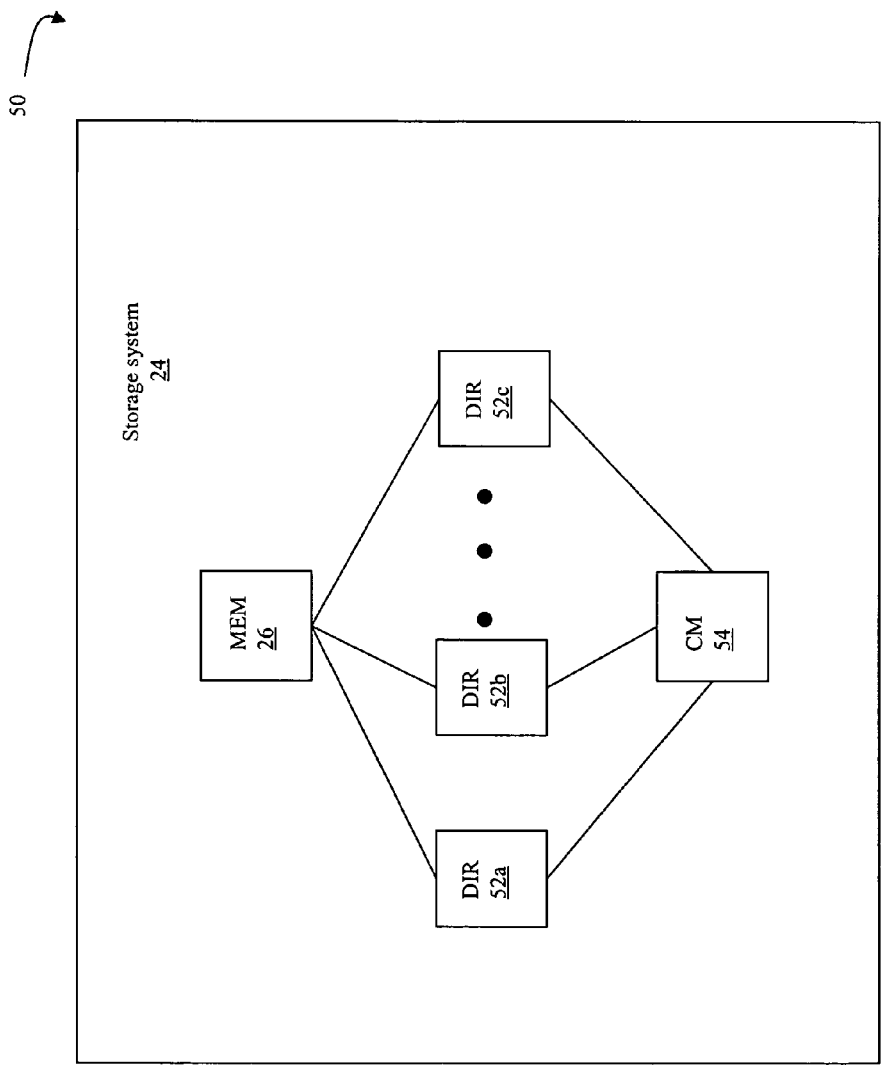
FIG. 3 is an example of an embodiment of a data storage system included in the system of FIGS. 1 and 2.

Referring now to FIG. 3, a diagram 50 illustrates an embodiment of the storage system 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixteen directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c.

Figure 4A:
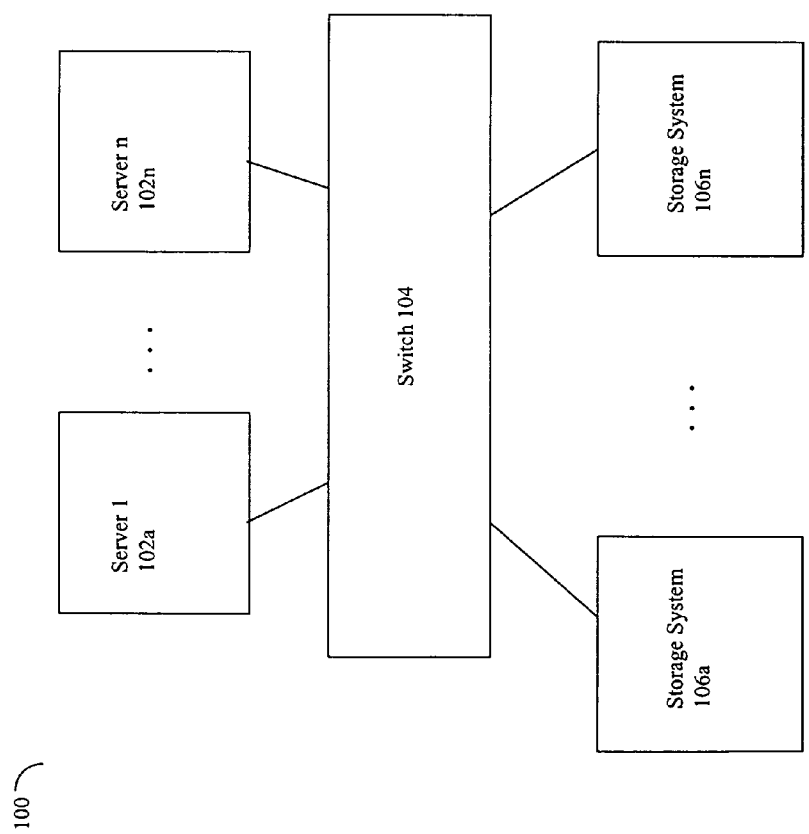
FIG. 4A is an example of a server coupled to an intelligent switch which is coupled to one or more data storage systems.

Referring now to FIG. 4A, a diagram 100 illustrates a plurality of servers 102a-102n coupled to a storage routing infrastructure 104, also referred to herein as an intelligent switch. An intelligent switch is comprised of one or more data path computing elements as well as switch-based communications routing hardware. The switch 104 is coupled to a plurality of storage systems 106a-106n. One or more of the storage systems 106a-106n may be like the storage system 24 described above. Alternatively, it is possible that none of the storage systems 106a-106n are like the storage system 24 described above. The system described herein contemplates an environment where all of the storage systems 106a-106n are alike (homogenous) or an environment where some of the storage systems 106a-106n are different (heterogeneous). The couplings between the servers 102a-102n, the switch 104, and the storage systems 106a-106n may be made in any appropriate fashion including (optionally) that one or more of the couplings is through one or more other devices (not shown) and/or through the Internet or some other network, of any size and configuration.

The intelligent switch 104 may be used to present to one or more of the servers 102a-102n one or more contiguous logical volumes or devices that correspond to storage on one or more of the storage devices 106a-106n. The switch 104 maps logical storage space presented to the server 102 to actual storage space on the storage systems 106a-106n. The storage space on the storage systems 106a-106n for any contiguous logical volume may or may not be contiguous. In addition, the storage space for any contiguous logical volume may or may not span more than one of the storage systems 106a-106n. For any logical volume, each of the servers 102a-102n is presented with a contiguous storage space irrespective of the mapping by the switch to the storage systems 106a-106n.

The intelligent switch 104 may allow for dynamic remapping of logical volumes presented to the servers 102a-102n during operation so that the remapping is somewhat transparent to the servers 102a-102n. Thus, for example, logical storage space x1-x2 may be initially mapped to storage space y1-y2 on the storage systems 106a-106n and then may be remapped during operation to a different storage space y3-y4 on the storage systems 106a-106n. This remapping may occur many times. In addition, remapping may cause previously contiguous mapped space on the storage systems 106a-106n to become noncontiguous or cause previously noncontiguous mapped space on the storage systems 106a-106n to become contiguous. For example, logical storage space x1-x2 may be initially mapped to storage space y1-y2 on the storage systems 106a-106n and may be remapped so that logical storage space x1-x1a is mapped to storage space y3-y4 on the storage systems 106a-106n while logical storage space x1a-x2 is remapped to storage space y5-y6 on the storage systems 106a-106n, where y3-y4 is not contiguous to y5-y6. After the remapping, the logical storage space x1-x2 appears contiguous to one or more of the servers 102a-102n even though the space x1-x2 is mapped to noncontiguous spaces on the storage systems 106a-106n.

It should be noted that the servers 102a-102n may correspond to one or more of the hosts previously described in connection with FIGS. 1 and 2. Additionally, an embodiment may include a different number of one or more hosts functioning as servers than as shown in FIG. 4A.

Figure 4B:
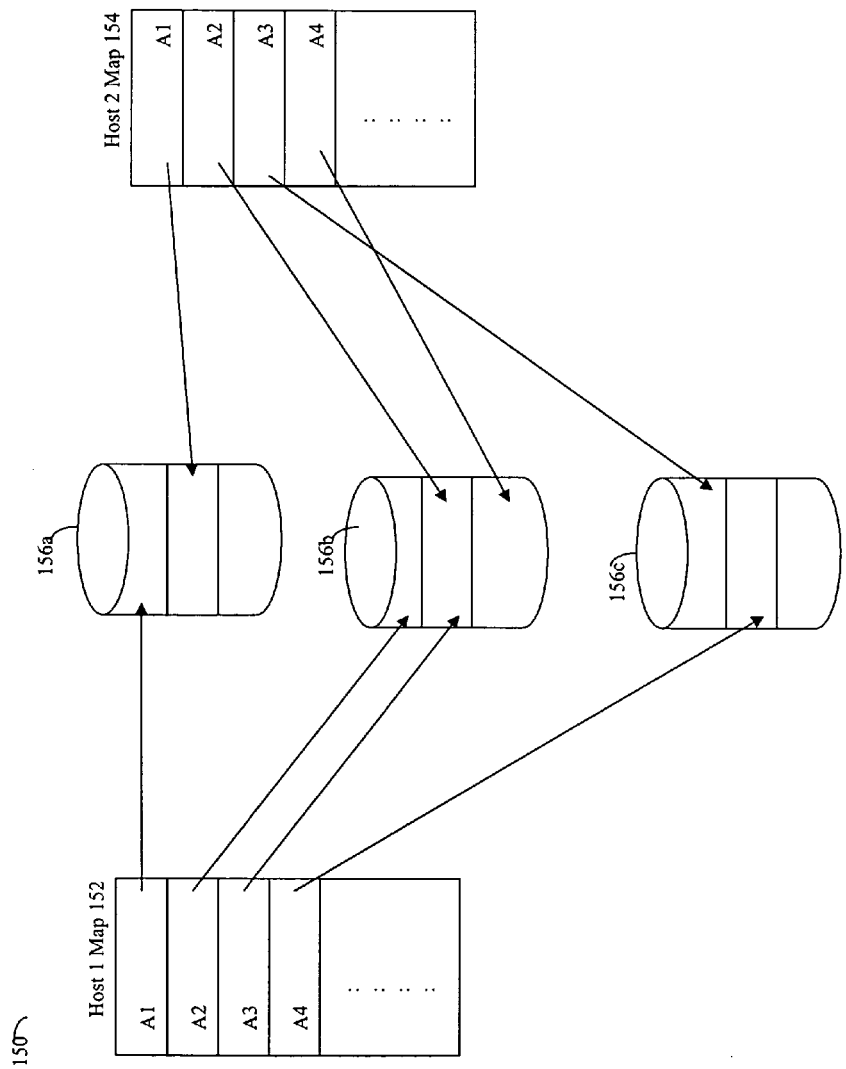
FIG. 4B is an example illustrating how the switch maps the primary storage in accordance with each host or server's point of view of the storage.

Referring now to FIG. 4B, shown is an example 150 of how the switch may be used in connection with representing the physical storage in accordance with the view point of a particular host. In the example 150, included are two maps 152 and 154. Map 152 may be used in representing the storage devices 156a-156c to a first host. Map 154 may be used in representing the storage devices 156a-156c to a second different host. The mapping may be performed using functionality included within an embodiment of the switch such that the hosts can communicate directly with the switch and have the data represented in accordance from the perspective of each host. It should be noted that the components and functionality for representing the physical storage in accordance with the view of a particular host may be extended to other embodiments and variations as will be appreciated by one of ordinary skill in the art, for example, as described in pending U.S. patent application Ser. No. 09/608,521, filed on Jun. 30, 2000, which is incorporated by reference herein. In the example 150, each of the maps includes locations identified as A1, A2, and the like. Each of these locations may correspond, for example, to a logical unit or volume, or other element referenced by a host.

Figure 5:
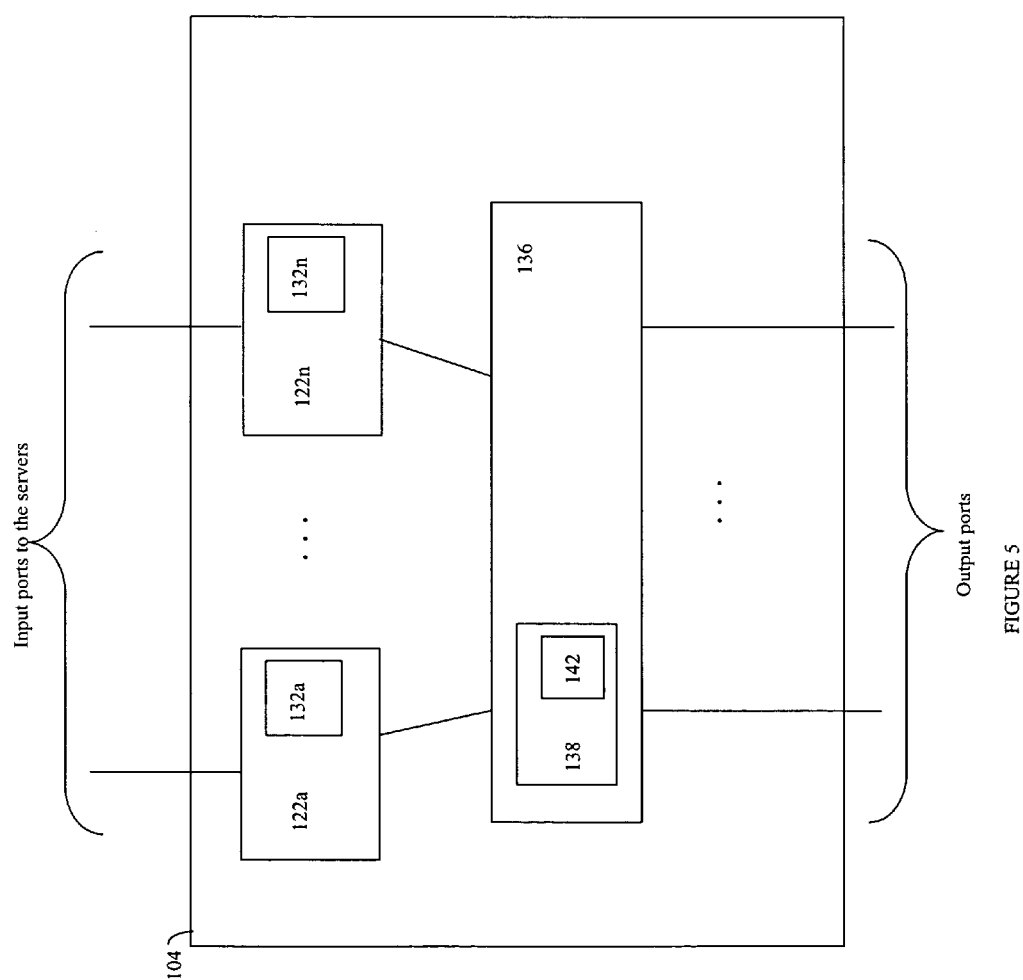
FIG. 5 is an example of an embodiment of an intelligent switch included in FIG. 4A.

Referring now to FIG. 5, an embodiment of the switch 104 is shown in more detail where each of a plurality of input ports for the switch 104 has one of a plurality of local processor boards 122a-122n. Each of the processor boards 122a-122n includes a respective on-board memory 132a-132n for local data storage thereon. Each of the processor boards 122a-122n is coupled to a switch backplane 136, that handles routing of data and connections between the input ports and the output ports of the switch 104. The switch backplane 136 may be controlled by a backplane processor board 138 which includes memory 142. In some embodiments, the memory 142 is local to the processor board 138. In other embodiments, the memory 142 is global and thus accessible to one or more of the processor boards 122a-122n.

It should be noted that although FIG. 5 illustrates a single processor board associated with each port, an embodiment may also include other variations. For example, an embodiment may have multiple ports associated with a single one of processor boards 122a-122n.

The switch backplane 136 acts as a multiplexer that makes connections between the ports according to configuration information provided by the backplane processor board 138. In some embodiments, the memory 142 contains a switching table that controls mappings between input and output ports according to specific addresses provided at the input ports. The switch 104 may be implemented using off-the-shelf hardware provided by companies such as Brocade and Cisco.

An output port may be associated with each of the data storage systems or other components that may be coupled to the servers via the switch 104. In one embodiment, the switch may couple the servers to one or more primary data storage systems, and one or more other data storage systems used to store a snapshot or point in time copy of data sets included in the primary data storage systems.

Figure 6:
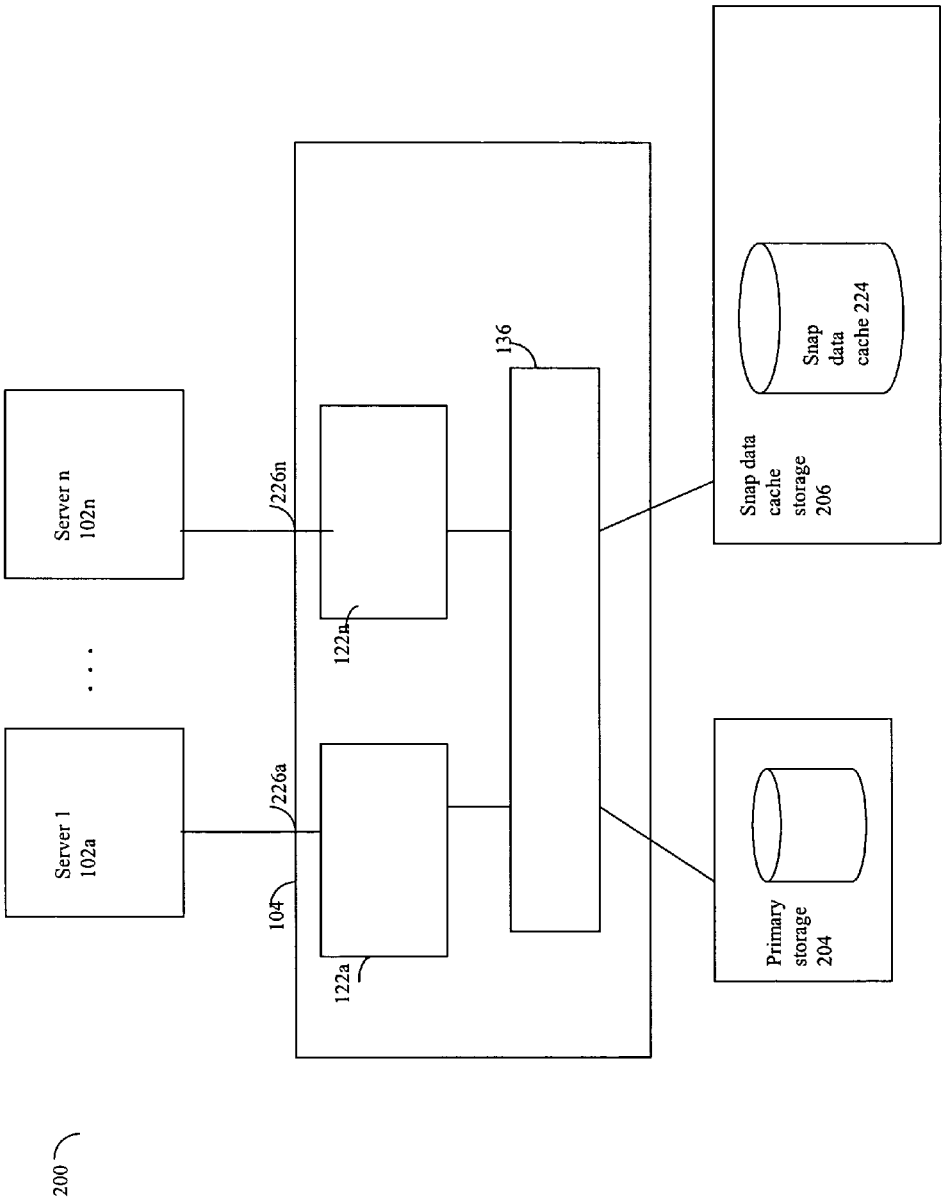
FIG. 6 is an example of an embodiment of a system of FIG. 1 shown in more detail.

Referring now to FIG. 6, shown is an example of an embodiment 200 of components that may be included in a system providing for a point in time copy or snapshot of a data set. It should be noted that the components included in 200 may be characterized as a more detailed description of components that may be included in an embodiment of the system 10 previously described in connection with FIG. 1. The components of 200 include servers 102a through 102n, a switch 104, a primary storage 204 and a snap data area storage 206. Each of the servers 102a through 102n is described elsewhere herein in more detail. Similarly, components within the embodiment of the switch 104 are also described elsewhere herein.

It should be noted that other components may be included in a system than as shown herein. The particular components and details included in FIG. 6 are for the purpose of illustrating the techniques of a snapshot or point in time copy of a data set.

The primary storage 204 may correspond to one or more data storage systems or devices included therein as described elsewhere herein connected to the switch 104. Similarly, the snap data area storage 206 may correspond to one or more data storage systems or devices included therein as described elsewhere herein. The primary storage 204 in this example is used for storing the actual data or a primary copy of the data. Data modifications, such as by an application executing on one or more of the servers 102*a*-102*n*, are performed to the data included in the primary storage. The snap data area storage 206 in this example is used in connection with storing a snapshot or point in time copy of the primary storage 204 with respect to a particular point-in-time of the primary storage 204. Described in following paragraphs are different techniques that may be used in connection with creating a point in time copy of data from the primary storage in the snap data area's storage.

In operation, each of the servers may perform a write operation to the primary storage 204. Each of the write operations is received at the switch 104 through one of the ports 226*a*-226*n*. Using a map as stored in the switch 104, a server's I/O request is mapped to one of the output ports. It should be noted that maps may be used, as described previously in connection with FIG. 4B, to provide a virtualization or mapping to a server. In other words, metadata may be characterized as describing the relationship between storage elements of the backend storage areas (such as storage areas 204 and 206) and the volumes presented to the front end hosts or servers.

One of the servers may issue a command, for example, requesting creation of a snapshot or point in time copy of a data set of the primary storage 204 at a first point in time in accordance with the requesting server's map. Subsequent write operations are made with respect to this first point in time copy of the data using the snap data area and a two-phase snap copy technique described in following paragraphs.

Figure 7:
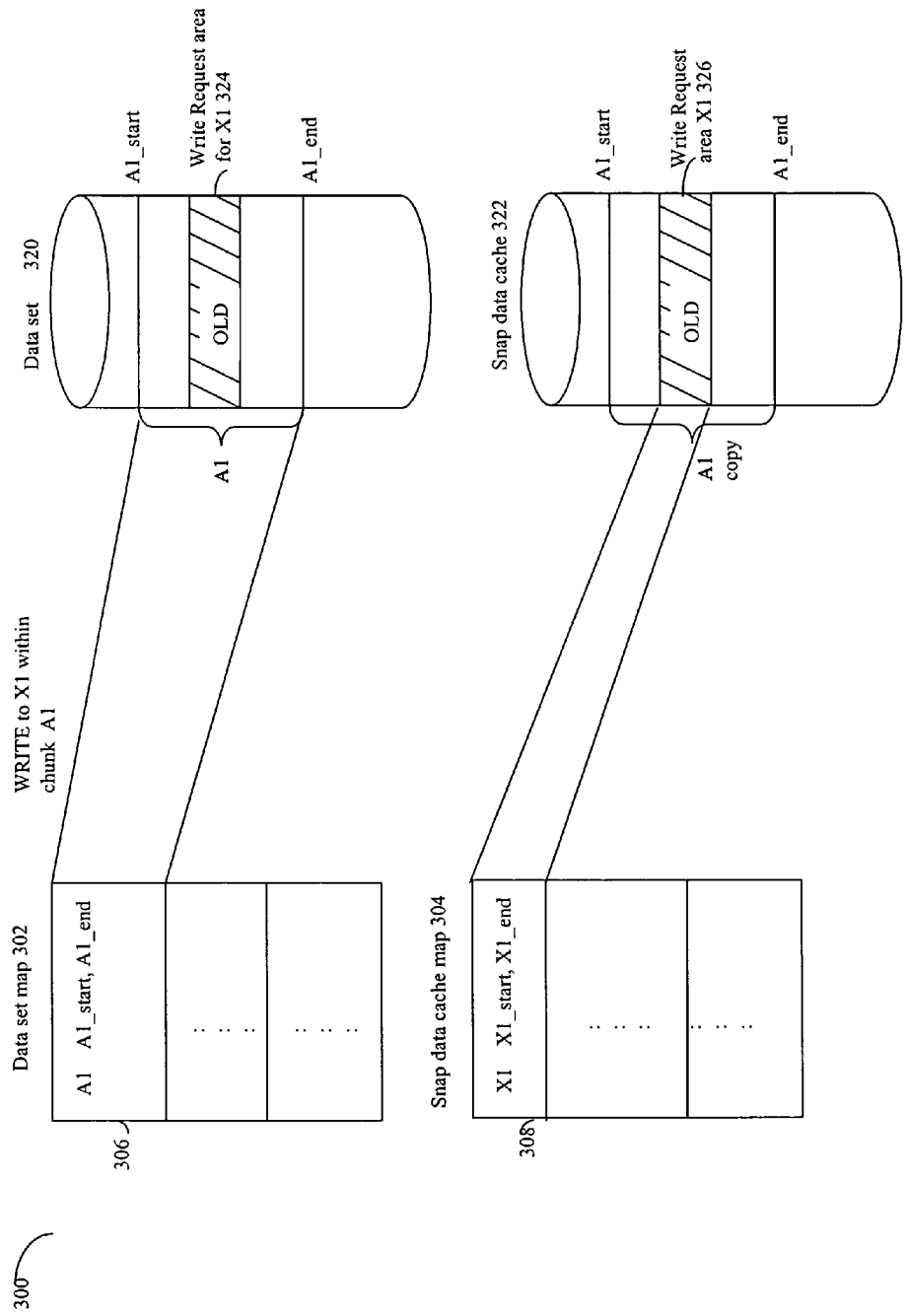
FIGS. 7 and 8 are example illustrations of one embodiment of a first phase of a two phase snap copy technique.
Figure 8:
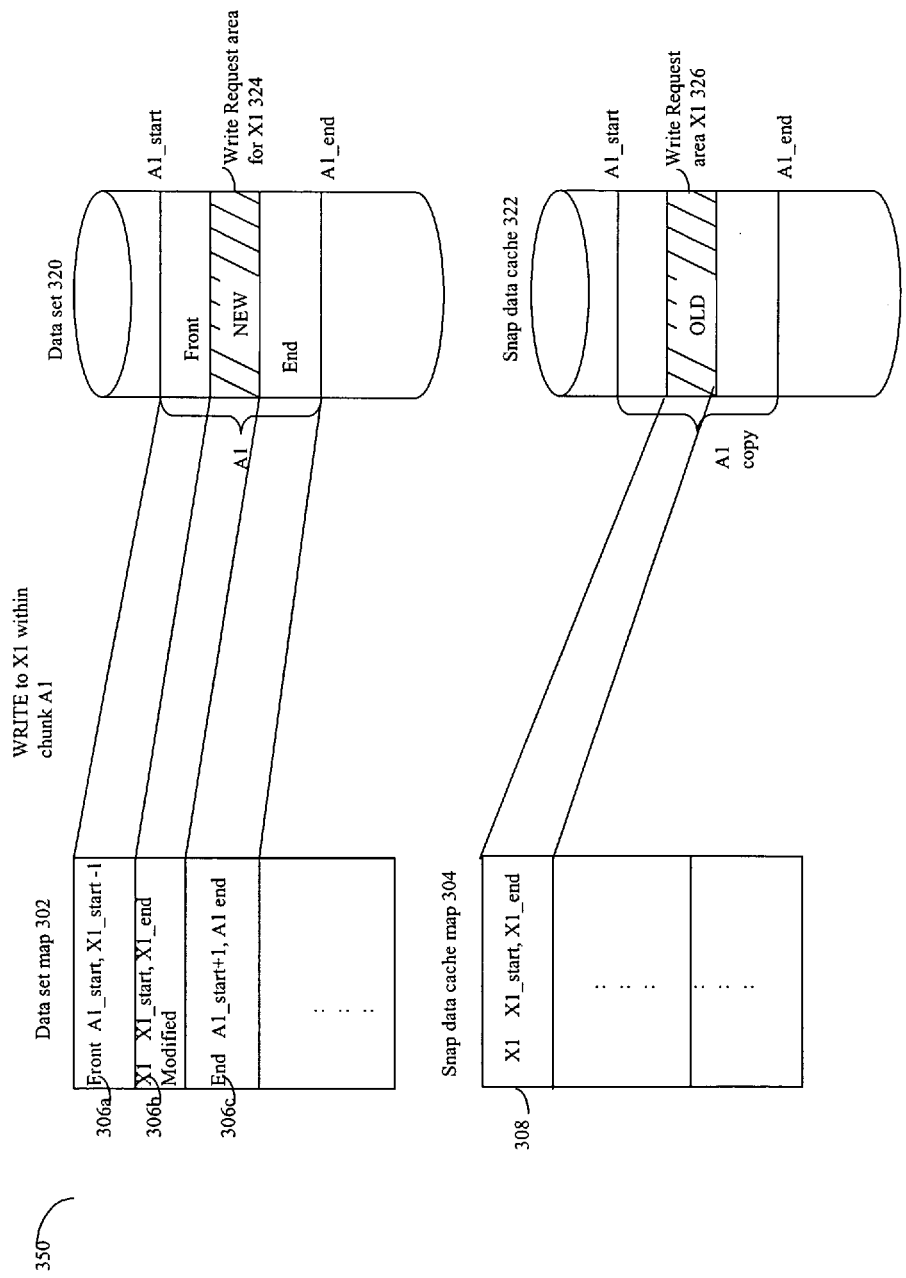
Figure 9:
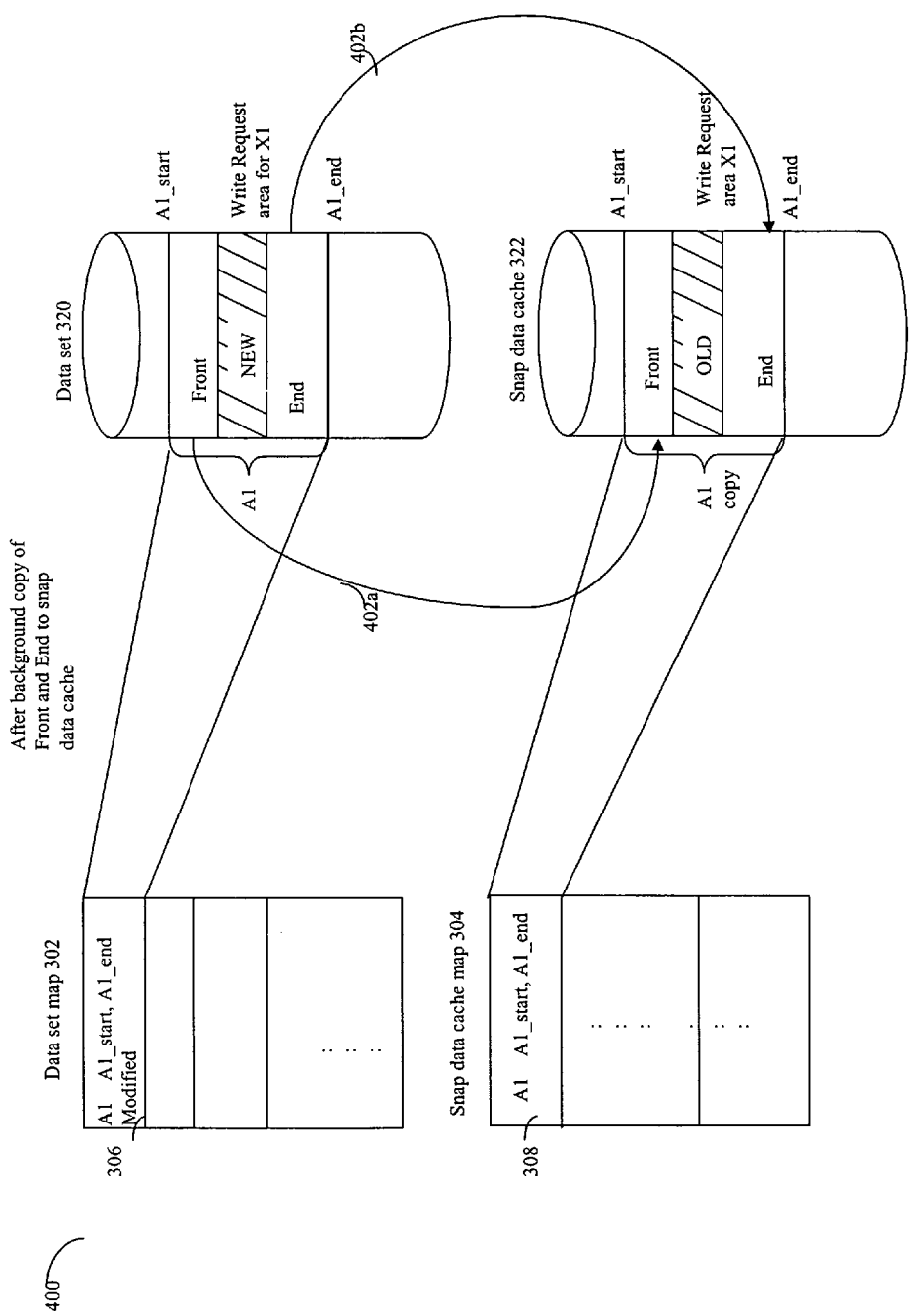
FIG. 9 is an example illustration of one embodiment of a second phase of a two phase snap copy technique.

In following paragraphs, FIGS. 7 and 8 illustrate a first phase of the snap copy technique, and FIG. 9 illustrates the second phase of the snap copy technique in one embodiment.

Referring now to FIG. 7, shown is an example of data maps used in connection with creating a snapshot copy of a data set using a snap data area. Included in FIG. 7 is a data set map 302 and a snap data area map 304. Maps 302 and 304 may be stored and used within the switch as described elsewhere herein in connection with other figures to provide a virtualization or data view point to a particular server. In this example, the data set map 302 may be used in connection with mapping a data set including A1 to a particular data storage device 320. Similarly, a snap data area map 304 in this example may be used in mapping particular entries within the map 304 to one or more devices 322 (or portions thereof) of the snap data area.

The map 302 may be used in mapping a data set included in primary storage. The map 304 may be used in mapping a snapshot copy of the data set using the snap data area and its associated data storage area. It should be noted that this example only shows data for the data set as residing a single device. However, as will be appreciated by one of ordinary skill in the art, the technique described herein may be used with making a snapshot copy of a data set residing on multiple devices, or portions thereof.

In the technique described in following paragraphs, when there is a write to a portion of a data set, such as within the data set as mapped by the map 302, a copy of the old data which is at the target location of the write operation is made within the snap data area prior to writing out the new data associated with the write I/O request. This is performed in connection with the first phase of the snap two phase copy technique.

In this example, data associated with the data set as mapped by data set map 302 is divided into chunks. When a write request is received, such as a write to a portion of X1, it is determined which chunk includes the target of the write operation request. For example, with a write request to a data area X1, the chunk A1 includes the target of the write operation, X1. As will be described in connection with the following steps, the size of the chunk may vary in accordance with an embodiment. Generally, the size of the chunk may be a fixed size, a fixed parameter, a variable parameter, or even a dynamically varied parameter that may be set in any one of a variety of ways in an embodiment. The chunk size may be characterized as moderately large in connection with the size of the data portions that are used in connection with performing an I/O request for a copy on first write associated with a data set in which data is transferred between data storage devices.

It should be noted that a I/O operation, as received from a user on a host or server, may span more than one chunk depending on the address and size of the I/O operation.

Once the particular chunk or chunks which include the target of the write operation is determined, the data stored at the target location of the write request is read from the data storage device. In this example, the data stored at location X1 324 which is the target of the write operation is read from the data storage device 320. A portion of storage within the snap data area is allocated. In this example, storage portions within the snap data area are allocated in an amount equal to the size of a chunk. As part of the first phase of the two phase snap copy operation described herein, the old data, such as the data from area 324 of the data set device 320, is read and written to the snap data area in area 326. An entry 308 is made in the snap data area map 304 indicating that area X1 is located within the snap data area as illustrated in FIG. 7 at a particular offset location within the allocated chunk A1 copy.

It should be noted that, although not explicitly stated in processing steps described herein, one of ordinary skill in the art will appreciate that any one of a variety of locking mechanisms may be used in connection with performing synchronization techniques as needed when accessing shared resources such as the data set map 302, the snap data area map 304, the data set device 320, and the device(s) 322 for the snap data area. As such, the particular steps of locking and unlocking shared resources, for example, are not mentioned herein with processing steps in connection with performing the two phase snap copy although they may be performed as needed in accordance with ensuring proper synchronization of shared resources within an embodiment. Additionally, the particular granularity with which a resource is locked may vary in accordance with each embodiment.

Referring now to FIG. 8, shown is an illustration 350 continuing processing associated with the first phase of the two phase snap copy operation described herein.

Included in the data set map 302 as part of the first phase of the snap copy operation, three map entries are created in this example as a result of the write operation request. A single map entry 306*b* corresponds to the mapping for the data area X1 associated with the write request operation. Additionally, a map entry 306*a* (front) is associated with the data portion included in the chunk A1 which precedes location X1 denoted as front in this example. A map entry 306*c* is also created for the data portion denoted following X1 (end) which is the object of the write request operation. The new data is then written to area X1 324 on data set device 320. Additionally, the data set map entry 306*b* has an indicator, such as a bit flag, set to indicate that the data portion associated with the map entry 306*b* has been modified with respect to a point in time copy. Through the use of this bit flag and the snap data area map 304, for example, if a server requests data associated with the point in time copy version of data portion X1, the data set map entry 306*b* has an indicator of "modified" which directs the I/O request to the snap data area map.

It should be noted that any one of a variety of different techniques may be used in connection with implementation of a modification indicator such as the bit flag described above to identify "dirty" segments. In this embodiment, a data chunk may be characterized as "dirty" (i.e., has been modified such as by a write operation) with respect to the original point in time copy. An embodiment, for example, may store a bit flag with each entry, in a separate data structure such as a bitmap including dirty indicators for all map entries, or using other techniques known to those of ordinary skill in the art.

At this point, a response may be sent back to the client, such as the server or host system, which initiated the write request. The response may indicate the results of the I/O request completing with any additional status information in accordance with the particular write operation request. Also, after the first phase has completed so that the requested I/O for the write operation has been copied to the snap data area, I/O operations to the data set may resume. An embodiment may allow ongoing I/O operations during the first phase as well provided that access to shared resources is synchronized.

It should be noted that in this example, there are three data map entries created in the data set map 302 for a single write request. Depending on the particular write request and associated target location less than three entries may be created in the map 302. As described herein, map entries are created for any portion of a chunk A1 preceding location X1 and also following X1. In the event that the I/O request has a target location such as X1 which is at the beginning or at the ending boundary of a chunk, there may be no preceding (Front) or ending (end) data segment, respectively, as described herein. The foregoing results in using two (or one) map entries, as opposed to the three map entries, illustrated in the particular example 350 of FIG. 8.

A second phase of the snap copy operation may be performed while allowing online access to the data set. During the second phase described in following paragraphs, the remaining portions of the chunk to which the write operation has been performed may be copied as part of a background copy operation. With reference to the previous example, the chunk is A1. A portion, X1, of the chunk, A1, was the target of a write operation. As part of the background copy task associated with the second phase of the two phase snap copy operation, any remaining data preceding portion X1 (front) and following X1 (end) which is also included in the chunk A1 is copied to the snap data area.

In connection with the foregoing, a chunk area is initially allocated. Not all portions of the chunk in the snap data area may be immediately used for the storing remaining chunk portions. As described above, a first portion may be initially copied to the snap data are where the first portion is associated with the target write operation. The remaining front and/or end portions of the associated chunk may be copied by a background copy task at a later time as described above. At any point in time, the currently unused portions of the chunk area allocated in the snap data area (e.g., front and/or end portions) may be used for other purposes when not in use for the point in time copy as described herein. The currently unused portions of the chunk area may used for other purposes, and then returned for use in connection with the techniques described herein when the copy task, for example, actually performs the copy of the remaining front and/or end portions. The foregoing may provide for more efficient use of allocated memory and storage in an embodiment.

Referring now to FIG. 9, shown is an illustration of the second phase of the two phase snap copy operation described herein.

Any write operations to the chunk A1 are held, for example, in a queue and not allowed to begin in order to allow exclusive access as needed to the data set map 302 and the associated storage locations on device 320. Additionally, an embodiment may ensure that any existing I/Os or writes in progress to A1 have been drained and completed prior to continuing with the second phase of the snap copy operation.

In one embodiment, the background copy operation may be characterized as a proactive copy operation where the front-end portions of the chunk are proactively copied in the background after completion of the first phase. The copying of the remaining portions of the chunk is indicated by the associated arrows 402a (copy front portion) and 402b (copy end portion) in FIG. 9. Once the background copy is complete, the map entry 308 in the snap data area map 304 is updated to indicate that the entire chunk A1 is now stored in the snap data area. Additionally, data set map 302 is updated such that the previously associated three map entries in this example are now coalesced into a single map entry 306 for the entire chunk A1. The modified bit within the entry 306 is also set to indicate that the A1 associated with map entry 306 has been modified with respect to the point in time copy as maintained by the snap data area map 304. In the event that an I/O request is made to access the chunk A1, or any portion thereof, in the point in time copy, the data set map 302 refers the I/O request, through the use of the modified bit setting, to the snap data area map 304 to retrieve the appropriate data associated with the point in time copy.

What has been described in connection with the second phase may be characterized as a proactive case. It should be noted that an embodiment may include variations associated with how and when the second phase of the snap copy operation may be performed. For example, an embodiment may perform a variation of the second phase of the snap copy operation that may be characterized as an opportunistic approach. Using the opportunistic approach, additional write operations are allowed to proceed to the data set in accordance with the requests such as those made by an application on the server prior to performing the second phase. After a specified time period, the chunk may be examined to determine how much of the data associated with a particular chunk has already been copied to the snap data area as a result of I/O operations. When a threshold amount of the chunk has been copied as a result of write operations since the first phase has completed, the remaining portions of the chunk may be copied as part of a background copy operation. The specified time period as well as the particular threshold amount of a chunk that is copied prior to performing the background copy operation of remaining portions of a chunk may vary in accordance with each embodiment.

Figure 10:
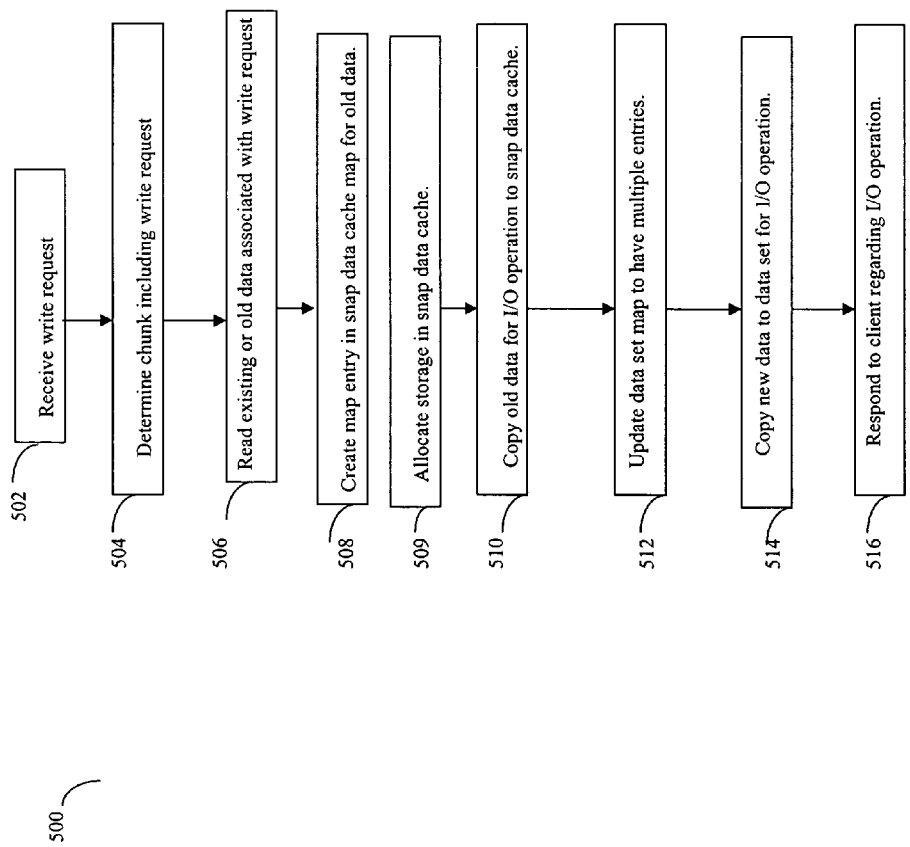
FIGS. 10 and 11 are flowcharts of processing steps of one embodiment of the two phase snap copy technique.
Figure 11:
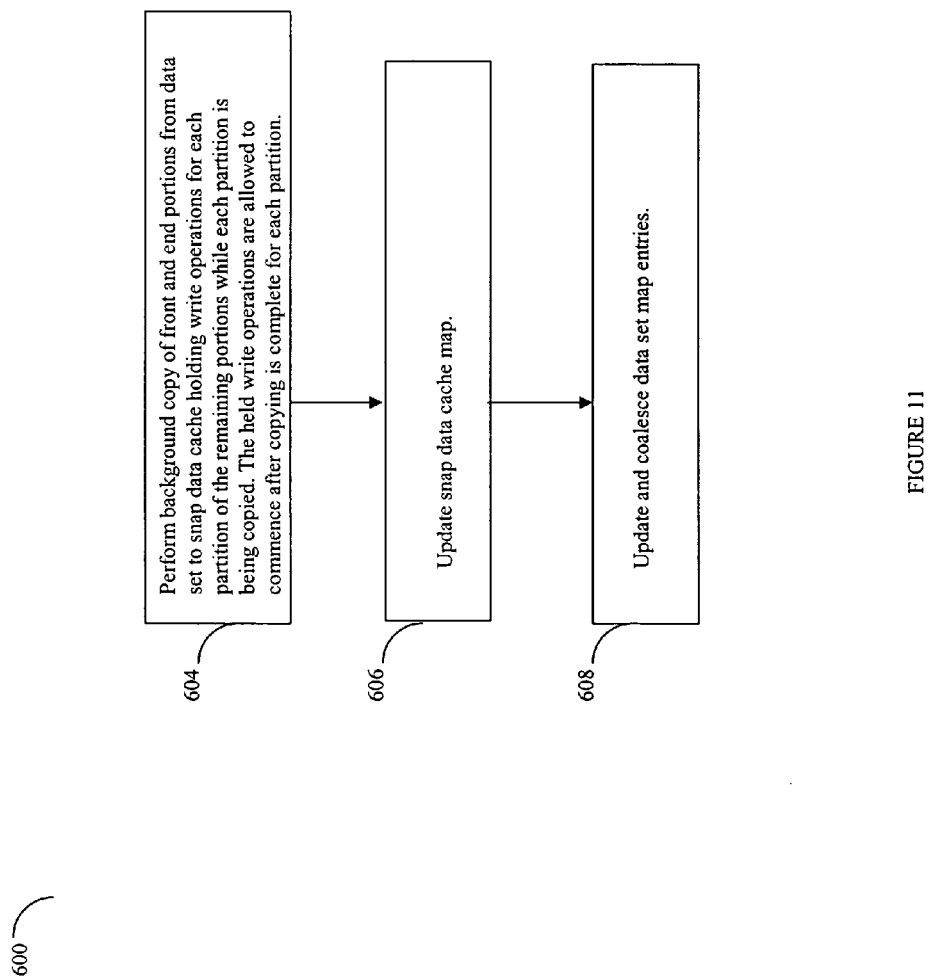

What will now be described in connection with FIGS. 10 and 11 are flowcharts summarizing the processing steps just described herein in connection with performing the two phase snap copy operation.

Referring now to FIG. 10, shown is a flowchart 500 of processing steps that may be performed in one embodiment in connection with the first phase of the two phase snap copy operation. At step 502, a write request is received by the switch, such as in connection with performing an I/O operation by an application on a server or host system. At step 504, the particular chunk including the target area of the write request is determined. At step 506, the existing or old data stored at the data location which is the target of the write operation request is read. At step 508, a map entry is created in the snap data area map for the old data. At step 509, storage is allocated in the snap data area in portions that are the size of the chunk. At step 510, the old data from the target location of the I/O operation is copied to the snap data area within the storage region allocated at step 509. At step 512, the data set map is updated to have multiple map entries (e.g., one, two or three) corresponding to the target data portion which is the target of the I/O request as well as any preceding and subsequent data portions with respect to the target location of the write request received at step 502. The map entries in total associated with step 512 map the entire chunk including the target storage location associated with the write request received at step 502. As described elsewhere herein, it should be noted that step 512 may include alternately two or three entries depending on the location of the storage address associated with the write request and its location within the chunk. As part of step 512 processing, the map entry associated with the target location of the write operation has its modified indicator set. At step 514, the new data associated with the write request received at step 502 is copied to the data set completing the I/O operation. At step 516, a response is sent to the client, such as the server or host which requested the initial I/O operation received at step 502.

Referring now to FIG. 11, shown is a flowchart 600 of processing steps summarizing the second phase of the two phase snap copy operation described herein. At step 604, the background copy operation of the front and end portions for the chunk is performed copying the front and end portions of the chunk of data to the snap data area. It should be noted that an embodiment may use a background copy task that further partitions each of the front and end portions, and copies each partition at various points in time. While each partition is copied, write operations corresponding to the partition are held or buffered and not allowed to commence. The held write operations are allowed to proceed after copying of the associated partition is complete. The background copy task may copy partitions of a size that may vary with each embodiment. At step 606, the snap data area map is accordingly updated. At step 608, the data set map is accordingly updated to have a single coalesced entry corresponding to the chunk with the modified indicator set.

As described elsewhere herein, it should be noted that additional steps may be performed in an embodiment prior to performing a second phase of the snap copy operation, such as, for example, in connection with the opportunistic approach described above. In connection with the opportunistic approach, the processing associated with flowchart 600 may be triggered or signaled when a particular threshold percentage of a data segment is written to with respect to a point in time copy.

It should be noted that the size of the actual chunk as well as other parameters used in processing steps herein may vary in accordance with each embodiment. For example, in one embodiment, I/O operations associated with the snap copy on first write may be performed in portions which may be, for example, 64K bytes. Independent of the size of a target of a write operation, data may be transferred from devices in these 64K byte portions. Accordingly, an embodiment may choose a chunk size which is a multiple of the 64K byte size. In one embodiment, the size of the chunk may be tuned in accordance with a system's performance such as, for example, the frequency of I/O operations, the size of the maps, and the like.

In accordance with the opportunistic approach, the particular data that is actually background copied depends on the amount of data that has been transferred to the snap data area already as a result of performing write operations. Associated with the opportunistic approach and the second phase of the snap copy operation, a background copy operation may be performed when the map is a threshold percentage or amount full based on the subsequent writes performed since a point in time copy request has been issued.

It should be noted that the processing steps associated with the two phase snap copy operation may be performed by code included within the switch in an embodiment. The code may include, for example, machine executable instructions which are stored within the switch 104 and may be executed by one or more processors also included within the switch 104. In one embodiment, the processing steps of FIGS. 11 and 12 may be performed using instructions stored within hardware and/or software within the switch 104.

It should be noted, however, that although particular embodiments have been described herein such as in connection with using a switched fabric environment with the switch 104, the techniques described herein may also be used in connection with other embodiments as will be appreciated by one of ordinary skill in the art.

The foregoing describes an embodiment using a two-phase snap copy operation in which the original version is copied to the snap data area and then the original is overwritten. The techniques described herein may also be used in connection with a two-phase snap copy operation in which the new write data or updated version of a data set is stored in the snap data area and the original source location is maintained as the point in time copy. Subsequent writes occur to the snap data area in this alternate embodiment.

Using the foregoing techniques, described is an embodiment which provides for an efficient allocation of storage within the snap data area as well as minimizing fragmentation of maps used in managing the snap data area and data set. The foregoing performs a two phase copy technique which efficiently provides for returning a response to a requesting host or server making a write request and subsequently copying remaining portions of data associated with a chunk. The foregoing describes a unique allocation of tasks and division of labor into two phases which provides for a sufficiently low latency I/O request response to a server system. Additionally, in connection with performing the copy on write as part of the first phase, when a write request is received on one of the input ports of the switch, the current value of the data prior to applying the data modification for the write request is copied into the snap data area. In order to have a snapshot copy of the data using the techniques described herein, prior to performing a write operation to a portion of data includes first performing a read of the data and copying the data to the snap data area prior to performing the write operation. In effect, a set of write operations are inserted into the processing when performing a write request where the read operation reads the old data from the primary storage, stores it in the snap data area, and subsequently writes out the modified data to the physical storage in accordance with the write request received. Using this technique, the amount of storage required for a snapshot copy may be minimized in that an entire copy of the primary storage is not required to be maintained. The two phases of the copy technique described herein provide benefits. First, the technique efficiently manages map resources in the embodiment described herein using an intelligent switch or other storage routing infrastructure. This makes using multiple snapshots more readily feasible in this particular embodiment.

While the invention has been disclosed in connection with various embodiments, modifications thereon will be readily apparent to those skilled in the art. Accordingly, the spirit and scope of the invention is set forth in the following claims.

What is claimed is:

1. A method for creating a point in time copy of a data set comprising:
    receiving a write request to modify a target location in a segment of said data set; and
    in response to receiving said write request, performing processing, said processing including:

allocating a portion in a data area, said portion being a size of said segment;

copying existing data from said target location to said portion of said data area;

updating said target location in accordance with said write request; and copying remaining areas of said segment to said portion of said data area as part of a background copy operation while allowing I/O operations to said data set, wherein unused areas of said portion corresponding to said remaining areas of said segment are available for another use besides said point in time copy until said background copy operation performs copying of said remaining data areas to said portion.

2. The method of claim 1, wherein said receiving, said copying existing data to said data area, and said updating are included in a first phase of a copy technique.

3. The method of claim 2, wherein I/O operations to said segment are performed during said first phase.

4. The method of claim 1, wherein, after said updating, a response is sent to a requestor initiating said write request indicating a status of said write request.

5. The method of claim 4, wherein said requestor is a host system.

6. The method of claim 4, wherein said copying said remaining areas of said segment is included in a second phase of a copy technique.

7. The method of claim 6, wherein said second phase is performed after sending said response to a requester.

8. The method of claim 7, wherein said second phase is performed proactively.

9. The method of claim 7, further comprising:

determining when a threshold amount of said segment is copied to said data area as a result of I/O operations; and in response to said determining, performing said second phase.

10. The method of claim 1, wherein said allocating, said copying existing data, and said copying remaining areas are performed only when said write request is a first write request with respect to said point in time copy.

11. The method of claim 3, wherein said first phase further comprises:

determining a first data area physically immediately preceding said target location in said segment;

determining a second data area physically immediately following said target location in said segment;

creating an entry in a first map for said data set for each of said target location, said first data area, and said second data area, said data set being included in a logical volume that is mapped to a physical storage location in accordance with entries in said first map, said entries being created when a size of an associated logical data area is non-zero; and creating an entry in a second map for said target location in said data area, wherein a logical volume for said data area is mapped to physical storage in accordance with entries in said second map.

12. The method of claim 11, wherein, if said first data area is empty, no entry is created in said first map corresponding to said first data area, and wherein if said second data area is empty, no entry is created in said first map corresponding to said second data area.

13. The method of claim 12, wherein said copying remaining areas is included in a second phase of said copy technique.

14. The method of claim 13, wherein said second phase further comprises:

coalescing entries in said first map for said portion of said data set into a single entry for said entire portion; and setting an indicator in said single entry indicating that said portion of said point in time copy has been modified.

15. The method of claim 6, wherein said second phase further comprises:

updating a status indicator to indicate which portions of said remaining areas have been copied.

16. The method of claim 11, wherein said second map is used in combination with said first map to obtain said point in time copy of said data set, and wherein said first map is used to obtain a current view of said data set.

17. A computer readable medium for creating a point in time copy of a data set comprising code stored thereon that:

processes a write request received to modify a target location in a segment of said data set; and in response to receiving said write request, performs processing, said code that performs said processing in response to receiving said write request including code that:

allocates a portion in a data area, said portion being a size of said segment;

copies existing data from said target location to said portion of said data area;

updates said target location in accordance with said write request; and copies remaining areas of said segment to said portion of said data area as part of a background copy operation while allowing I/O operations to said data set, wherein unused areas of said portion corresponding to said remaining areas of said segment are available for another use besides said point in time copy until said background copy operation performs copying of said remaining data areas to said portion.

18. The computer readable medium of claim 17, wherein said code that processes said write request, said code that copies existing data to said data area, and said code that updates are included in code that performs a first phase of a copy technique.

19. The computer readable medium of claim 18, wherein I/O operations to said segment are performed during said first phase.

20. The computer readable medium of claim 17, further including code that sends a response to a requester initiating said write request indicating a status of said write request.

21. The computer readable medium of claim 20, wherein said requestor is a host system.

22. The computer readable medium of claim 20, wherein said code that copies said remaining areas of said segment is included in code that performs a second phase of a copy technique.

23. The computer readable medium of claim 22, wherein said second phase is performed after sending said response to said requester.

24. The computer readable medium of claim 23, wherein said second phase is performed proactively.

25. The computer readable medium of claim 23, further comprising code that:

determines when a threshold amount of said segment is copied to said data area as a result of I/O operations; and in response to said determining, performs said second phase.

26. The computer readable medium of claim 17, wherein said code that allocates, said code that copies existing data, and said code that copies remaining areas are executed only when said write request is a first write request with respect to said point in time copy.

27. The computer readable medium of claim 19, wherein said code that performs first phase further comprises code that:
- determines a first data area physically immediately preceding said target location in said segment;
- determines a second data area physically immediately following said target location in said segment;
- creates an entry in a first map for said data set for each of said target location, said first data area, and said second data area, said data set being included in a logical volume that is mapped to a physical storage location in accordance with entries in said first map, said entries being created when a size of an associated logical data area is non-zero; and
- creates an entry in a second map for said target location in said data area, wherein a logical volume for said data area is mapped to physical storage in accordance with entries in said second map.

28. The computer readable medium of claim 27, wherein, if said first data area is empty, no entry is created in said first map corresponding to said first data area, and wherein if said second data area is empty, no entry is created in said first map corresponding to said second data area.

29. The computer readable medium of claim 28, wherein said code that copies said remaining areas is included in code that performs a second phase of said copy technique.

30. The computer readable medium of claim 29, wherein said code that performs said second phase further comprises code that:
- coalesces entries in said first map for said portion of said data set into a single entry for said entire portion; and
- sets an indicator in said single entry indicating that said portion of said point in time copy has been modified.

31. The computer readable medium of claim 22, wherein said code that performs said second phase further comprises code that:
- updates a status indicator to indicate which portions of said remaining areas have been copied.

32. The computer readable medium of claim 27, wherein said second map is used in combination with said first map to obtain said point in time copy of said data set, and wherein said first map is used to obtain a current view of said data set.

33. A method for creating a point in time copy of a data set comprising:
- receiving a write request to modify a target location in a segment of said data set; and
- in response to receiving said write request, performing processing, said processing including:
  - allocating a portion in a data area, said portion being a size of said segment;
  - updating a corresponding target location in said portion of said data area corresponding to said target location in said data set; and
  - copying remaining areas of said segment included in said data set to said portion of said data area as part of a background copy operation while allowing I/O operations to said data set, said remaining areas being areas of said segment excluding said target location, wherein unused areas of said portion corresponding to said remaining areas of said segment are available for another use besides said point in time copy until said background copy operation performs copying of said remaining data areas to said portion.

34. A computer readable medium for creating a point in time copy of a data set comprising code stored thereon that:
- processes a write request received to modify a target location in a segment of said data set; and
- in response to receiving said write request, performs processing, said code that performs processing in response to receiving said write request including code that:
  - allocates a portion in a data area, said portion being a size of said segment;
  - updates a corresponding target location in said portion of said data area corresponding to said target location in said data set; and
  - copies remaining areas of said segment included in said data set to said portion of said data area as part of a background copy operation while allowing I/O operations to said data set, said remaining areas being areas of said segment excluding said target location, wherein unused areas of said portion corresponding to said remaining areas of said segment are available for another use besides said point in time copy until said background copy operation performs copying of said remaining data areas to said portion.

* * * * *